US009614449B2

(12) United States Patent
Chang et al.

(10) Patent No.: US 9,614,449 B2
(45) Date of Patent: Apr. 4, 2017

(54) FLYBACK POWER CONVERTER WITH PROGRAMMABLE OUTPUT AND CONTROL CIRCUIT AND CONTROL METHOD THEREOF

(71) Applicant: RICHTEK TECHNOLOGY CORPORATION, Zhubei, HsinChu (TW)

(72) Inventors: Kuang-Fu Chang, Kaohsiung (TW); Tzu-Chen Lin, Changhua (TW); Chien-Fu Tang, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 4 days.

(21) Appl. No.: 14/879,175

(22) Filed: Oct. 9, 2015

(65) Prior Publication Data

US 2016/0105116 A1 Apr. 14, 2016

Related U.S. Application Data

(60) Provisional application No. 62/061,822, filed on Oct. 9, 2014.

(51) Int. Cl.
*H02M 3/335* (2006.01)
*H02M 1/00* (2006.01)

(52) U.S. Cl.
CPC .................. *H02M 3/33523* (2013.01); *H02M 2001/0032* (2013.01); *Y02B 70/16* (2013.01)

(58) Field of Classification Search
CPC ..... H02M 3/33523; H02M 2001/0032; H02M 3/28; H02M 3/335
USPC ....... 363/16, 20, 21.01, 21.12, 21.15, 21.16, 363/21.17
See application file for complete search history.

(56) References Cited

U.S. PATENT DOCUMENTS 4,849,869 A * 7/1989 Tanuma ............ H02M 3/33523 363/21.13
8,472,214 B2 * 6/2013 Huang ............. H02M 3/33523 363/21.12
8,488,341 B2 * 7/2013 Kim ................. H02M 3/33523 363/21.15
8,582,324 B2 * 11/2013 Lin ......................... H02M 1/14 363/21.12
8,811,043 B2 * 8/2014 Chang ..................... H02M 1/32 363/21.12

(Continued)

*Primary Examiner* — Gary L Laxton
*Assistant Examiner* — Kyle J Moody
(74) *Attorney, Agent, or Firm* — Tung & Associates

(57) ABSTRACT

The present invention provides a flyback power converter with a programmable output and a control circuit and a control method thereof. The flyback power converter converts an input voltage to a programmable output voltage according to a setting signal, wherein the programmable output voltage switches between different levels. The flyback power converter includes: a transformer circuit, a power switch circuit, a current sense circuit, an opto-coupler circuit, and a control circuit. The control circuit adaptively adjusts an operation signal according to a level of the programmable output voltage, to maintain a same or relatively higher operation frequency of the operation signal when the programmable output voltage switches to a relatively lower level, so as to maintain a phase margin while supplying the same output current.

17 Claims, 4 Drawing Sheets

(56) References Cited

U.S. PATENT DOCUMENTS

2014/0078789 A1* 3/2014 Li .................... H02M 3/33523
363/21.15

* cited by examiner

FLYBACK POWER CONVERTER WITH PROGRAMMABLE OUTPUT AND CONTROL CIRCUIT AND CONTROL METHOD THEREOF

CROSS REFERENCE

The present invention claims priority to U.S. 62/061,822, filed on Oct. 9, 2014.

BACKGROUND OF THE INVENTION

Field of Invention

The present invention relates to a flyback power converter with a programmable output and a control circuit and a control method thereof; particularly, it relates to such an output-programmable flyback power converter which maintains a same or relatively higher operation frequency and provides the same output current when its programmable output voltage switches to a relatively lower voltage, and a control circuit and a control method thereof.

Description of Related Art

A prior art output-programmable flyback power converter converts an input voltage to a programmable output voltage according to a setting signal, wherein the level of the output voltage is programmed according to different requirements of a load circuit. The programmable output voltage switches between at least two different levels according to the setting signal. In the prior art, when the output voltage is switched to a relatively lower level, compared to a relatively higher level, under the condition that the output current maintains the same, the output power will decrease whereby an operation frequency of an operation signal controlling a power switch of the flyback power converter decreases, and therefore, the equivalent output impedance decreases. That the equivalent output impedance decreases will cause the bandwidth of the overall system to increase, and decrease the phase margin of the system. In general, the phase margin is preferably higher than 45 degrees in a stable system. The phase margin of the aforementioned prior art output-programmable flyback power converter may become lower than 45 degrees or even a negative phase when it switches at the relatively lower output level, and the system is unstable.

In view of the above, the present invention proposes a flyback power converter with a programmable output which, as it provides a same output current, maintains a same or relatively higher operation frequency when a programmable output voltage switches to a relatively lower voltage, and a control circuit and a control method thereof.

SUMMARY OF THE INVENTION

From one perspective, the present invention provides a flyback power converter for supplying a programmable output voltage, wherein the flyback power converter switches the output voltage between at least a first voltage and a second voltage according to a setting signal, the first voltage being higher than the second voltage, the flyback power converter comprising: a transformer circuit, which includes: a primary winding, for receiving an input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a current sense circuit, which is coupled to the power switch circuit, for generating a current sense signal according to a switch current flowing through the power switch; an opto-coupler circuit, which is coupled to the secondary winding, for generating a feedback signal according to an output power and the setting signal; and a control circuit, which is coupled to the tertiary winding, the current sense circuit, the opto-coupler circuit, and the power switch circuit, for generating the operation signal according to the voltage sense signal, the current sense signal, and the feedback signal; wherein the control circuit reduces an operation frequency of the operation signal when the feedback signal is lower than a frequency reduction point; wherein the control circuit further adaptively adjusts the operation signal by at least one of the following methods according to the voltage sense signal, such that the flyback power converter a same or relatively higher operation frequency of the operation signal and provides a same output current when the output voltage is switched to the second voltage as compared with when the output voltage is switched to the first voltage, to maintain a phase margin:

(1) adaptively adjusting the frequency reduction point of the feedback signal according to the voltage sense signal;

(2) adaptively adjusting a current gain according to the voltage sense signal, and amplifying the current sense signal with the current gain to generate a current sense gain signal, such that the current sense gain signal when the output voltage is switched to the second voltage, is higher than the current sense gain signal when the output voltage is switched to the first voltage;

(3) adaptively adjusting a feedback attenuation according to the voltage sense signal, and attenuating the feedback signal with the feedback attenuation to generate a feedback attenuation signal, such that the feedback attenuation signal when the output voltage is switched to the second voltage, is lower than the feedback attenuation signal when the output voltage is switched to the first voltage; and (4) adaptively adjusting a slope compensation signal according to the voltage sense signal, and compensating a slope of the current sense signal with the slope compensation signal to generate a current sense compensation signal, such that the current sense compensation signal when the output voltage is switched to the second voltage, is higher than the current sense compensation signal when the output voltage is switched to the first voltage.

In one preferable embodiment, the control circuit includes: a frequency control circuit, which is coupled to the tertiary winding and the opto-coupler circuit, for generating a clock signal according to the voltage sense signal and the feedback signal; a comparison circuit, which is coupled to the opto-coupler circuit and the current sense circuit, for generating a comparison signal according to the feedback signal and the current sense signal; and a flip-flop circuit, which is coupled to the frequency control circuit and the comparison circuit, for generating the operation signal according to the clock signal and the comparison signal; wherein the frequency control circuit adaptively adjusts the frequency reduction point of the feedback signal by adjusting the clock signal according to the voltage sense signal.

In the aforementioned embodiment, when the feedback signal exceeds the frequency reduction point, the clock signal preferably has a constant first frequency, and when the feedback signal is between a threshold point and the frequency reduction point, the clock signal preferably has a second frequency which is adaptively adjusted according to the feedback signal, and when the feedback signal does not exceed the threshold point, the clock signal preferably has a constant third frequency; wherein the frequency control circuit preferably reduces the frequency reduction point when the output voltage is switched to the second voltage, to a level lower than the frequency reduction point when the output voltage is switched to the first voltage.

In one preferable embodiment, the control circuit includes: a frequency control circuit, which is coupled to the opto-coupler circuit, for generating a clock signal according to the feedback signal; a gain control circuit, which is coupled to the tertiary winding and the current sense circuit, for generating the current sense gain signal according to the voltage sense signal and the current sense signal; a comparison circuit, which is coupled to the opto-coupler circuit and the gain control circuit, for generating a comparison signal according to the feedback signal and the current sense gain signal; and a flip-flop circuit, which is coupled to the frequency control circuit and the comparison circuit, for generating the operation signal according to the clock signal and the comparison signal; wherein the gain control circuit adaptively adjusts the current gain according to the voltage sense signal, and amplifying the current sense signal with the current gain to generate the current sense gain signal, such that the current sense gain signal when the output voltage is switched to the second voltage, is higher than the current sense gain signal when the output voltage is switched to the first voltage.

In one preferable embodiment, the control circuit includes: a frequency control circuit, which is coupled to the opto-coupler circuit, for generating a clock signal according to the feedback signal; an attenuator circuit, which is coupled to the tertiary winding and the opto-coupler circuit, for generating the feedback attenuation signal according to the voltage sense signal and the feedback signal; a comparison circuit, which is coupled to the attenuator circuit and the current sense circuit, for generating a comparison signal according to the feedback attenuation signal and the current sense signal; and a flip-flop circuit, which is coupled to the frequency control circuit and the comparison circuit, for generating the operation signal according to the clock signal and the comparison signal; wherein the attenuator circuit adaptively adjusts the feedback attenuation according to the voltage sense signal, and attenuating the feedback signal with the feedback attenuation to generate the feedback attenuation signal, such that the feedback attenuation signal when the output voltage is switched to the second voltage, is lower than the feedback attenuation signal when the output voltage is switched to the first voltage.

In one preferable embodiment, the control circuit includes: a frequency control circuit, which is coupled to the opto-coupler circuit, for generating a clock signal according to the feedback signal; a slope compensation control circuit, which is coupled to the tertiary winding, for generating the slope compensation signal according to the voltage sense signal; an adder circuit, which is coupled to the slope compensation control circuit and the current sense circuit, for compensating the slope of the current sense signal with the slope compensation signal to generate a current sense compensation signal; a comparison circuit, which is coupled to the opto-coupler circuit and the adder circuit, for generating a comparison signal according to the feedback signal and the current sense compensation signal; and a flip-flop circuit, which is coupled to the frequency control circuit and the comparison circuit, for generating the operation signal according to the clock signal and the comparison signal; wherein the slope compensation control circuit adaptively adjusts the slope compensation signal according to the voltage sense signal, such that the current sense compensation signal when the output voltage is switched to the second voltage, is higher than the current sense compensation signal when the output voltage is switched to the first voltage.

From another perspective, the present invention provides a control method of a flyback power converter for supplying a programmable output voltage which is switchable between at least a first voltage and a second voltage according to a setting signal, wherein the first voltage is higher than the second voltage, the control method comprising: operating a power switch according to an operation signal, so as to convert the input voltage to the output voltage; generating a voltage sense signal according to the output voltage; generating a current sense signal according to a switch current flowing through the power switch; generating a feedback signal according to an output power and the setting signal; generating the operation signal according to the voltage sense signal, the current sense signal, and the feedback signal; reducing an operation frequency of the operation signal when the feedback signal is lower than a frequency reduction point; and adaptively adjusting the operation signal by at least one of the following methods according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin: (1) adaptively adjusting the frequency reduction point of the feedback signal according to the voltage sense signal; (2) adaptively adjusting a current gain according to the voltage sense signal, and amplifying the current sense signal with the current gain to generate a current sense gain signal, such that the current sense gain signal when the output voltage is switched to the second voltage, is higher than the current sense gain signal when the output voltage is switched to the first voltage; (3) adaptively adjusting a feedback attenuation according to the voltage sense signal, and attenuating the feedback signal with the feedback attenuation to generate a feedback attenuation signal, such that the feedback attenuation signal when the output voltage is switched to the second voltage, is lower than the feedback attenuation signal when the output voltage is switched to the first voltage; and (4) adaptively adjusting a slope compensation signal according to the voltage sense signal, and compensating a slope of the current sense signal with the slope compensation signal to generate a current sense compensation signal, such that the current sense compensation signal when the output voltage is switched to the second voltage, is higher than the current sense compensation signal when the output voltage is switched to the first voltage.

In one preferable embodiment, the step of generating the operation signal includes: generating a clock signal according to the voltage sense signal and the feedback signal; generating a comparison signal according to the feedback signal and the current sense signal; generating the operation signal according to the clock signal and the comparison signal; and adaptively adjusting the frequency reduction point of the feedback signal by adjusting the clock signal according to the voltage sense signal.

In one preferable embodiment, when the feedback signal exceeds the frequency reduction point, the clock signal has a constant first frequency, and when the feedback signal is between a threshold point and the frequency reduction point, the clock signal has a second frequency which is adaptively adjusted according to the feedback signal, and when the feedback signal does not exceed the threshold point, the clock signal has a constant third frequency; wherein the step of adaptively adjusting the frequency reduction point of the feedback signal by adjusting the clock signal according to the voltage sense signal, includes: reducing the frequency reduction point when the output voltage is switched to the second voltage, to a level lower than the frequency reduction point when the output voltage is switched to the first voltage.

In one preferable embodiment, the step of generating the operation signal includes: generating a clock signal according to the feedback signal; adaptively adjusting the current gain according to the voltage sense signal and the current sense signal; amplifying the current sense signal with the current gain to generate a current sense gain signal; generating a comparison signal according to the feedback signal and the current sense gain signal; and generating the operation signal according to the clock signal and the comparison signal; wherein the current sense gain signal when the output voltage is switched to the second voltage, is higher than the current sense gain signal when the output voltage is switched to the first voltage.

In one preferable embodiment, the step of generating the operation signal includes: generating a clock signal according to the feedback signal; adaptively adjusting the feedback attenuation according to the voltage sense signal; attenuating the feedback signal with the feedback attenuation to generate the feedback attenuation signal; generating a comparison signal according to the feedback attenuation signal and the current sense signal; and generating the operation signal according to the clock signal and the comparison signal; wherein the feedback attenuation signal when the output voltage is switched to the second voltage, is lower than the feedback attenuation signal when the output voltage is switched to the first voltage.

In one preferable embodiment, the step of generating the operation signal includes: generating a clock signal according to the feedback signal; generating the slope compensation signal according to the voltage sense signal; compensating the slope of the current sense signal with the slope compensation signal to generate a current sense compensation signal; generating a comparison signal according to the feedback signal and the current sense compensation signal; and generating the operation signal according to the clock signal and the comparison signal; wherein the current sense compensation signal when the output voltage is switched to the second voltage, is higher than the current sense compensation signal when the output voltage is switched to the first voltage.

From another perspective, the present invention provides a control circuit of a flyback power converter for supplying a programmable output voltage which is switchable between at least a first voltage and a second voltage according to a setting signal, wherein the first voltage is higher than the second voltage; wherein the flyback power converter includes: a transformer circuit, which includes: a primary winding, for receiving an input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a current sense circuit, which is coupled to the power switch circuit, for generating a current sense signal according to a switch current flowing through the power switch; an opto-coupler circuit, which is coupled to the secondary winding, for generating a feedback signal according to an output power and the setting signal; and the control circuit; wherein the control circuit reduces an operation frequency of the operation signal when the feedback signal is lower than a frequency reduction point; wherein the control circuit further adaptively adjusts the operation signal according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin; the control circuit comprising: a frequency control circuit, which is coupled to the tertiary winding and the opto-coupler circuit, for generating a clock signal according to the voltage sense signal and the feedback signal; a comparison circuit, which is coupled to the opto-coupler circuit and the current sense circuit, for generating a comparison signal according to the feedback signal and the current sense signal; and a flip-flop circuit, which is coupled to the frequency control circuit and the comparison circuit, for generating the operation signal according to the clock signal and the comparison signal; wherein the frequency control circuit adaptively adjusts the frequency reduction point of the feedback signal by adjusting the clock signal according to the voltage sense signal.

In one preferable embodiment, when the feedback signal exceeds the frequency reduction point, the clock signal has a constant first frequency, and when the feedback signal is between a threshold point and the frequency reduction point, the clock signal has a second frequency which is adaptively adjusted according to the feedback signal, and when the feedback signal does not exceed the threshold point, the clock signal has a constant third frequency; wherein the frequency control circuit reduces the frequency reduction point when the output voltage is switched to the second voltage, to a level lower than the frequency reduction point when the output voltage is switched to the first voltage.

From another perspective, the present invention provides a control circuit of a flyback power converter for supplying a programmable output voltage which is switchable between at least a first voltage and a second voltage according to a setting signal, wherein the first voltage is higher than the second voltage; wherein the flyback power converter includes: a transformer circuit, which includes: a primary winding, for receiving an input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a current sense circuit, which is coupled to the power switch circuit, for generating a current sense signal according to a switch current flowing through the power switch; an opto-coupler circuit, which is coupled to the secondary winding, for generating a feedback signal according to an output power and the setting signal; and the control circuit; wherein the control circuit reduces an operation frequency of the operation signal when the feedback signal is lower than a frequency reduction point; wherein the control circuit further adaptively adjusts the operation signal according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin; the control circuit comprising: a frequency control circuit, which is coupled to the opto-coupler circuit, for generating a clock signal according to the feedback signal; a gain control circuit, which is coupled to the tertiary winding and the current sense circuit, for generating the current sense gain signal according to the voltage sense signal and the current sense signal; a comparison circuit, which is coupled to the opto-coupler circuit and the gain control circuit, for generating a comparison signal according to the feedback signal and the current sense gain signal; and a flip-flop circuit, which is coupled to the frequency control circuit and the comparison circuit, for generating the operation signal according to the clock signal and the comparison signal; wherein the gain control circuit adaptively adjusts the current gain according to the voltage sense signal, and amplifying the current sense signal with the current gain to generate the current sense gain signal, such that the current sense gain signal when the output voltage is switched to the second voltage, is higher than the current sense gain signal when the output voltage is switched to the first voltage.

From another perspective, the present invention provides a control circuit of a flyback power converter for supplying a programmable output voltage which is switchable between at least a first voltage and a second voltage according to a setting signal, wherein the first voltage is higher than the second voltage; wherein the flyback power converter includes: a transformer circuit, which includes: a primary winding, for receiving an input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a current sense circuit, which is coupled to the power switch circuit, for generating a current sense signal according to a switch current flowing through the power switch; an opto-coupler circuit, which is coupled to the secondary winding, for generating a feedback signal according to an output power and the setting signal; and the control circuit; wherein the control circuit reduces an operation frequency of the operation signal when the feedback signal is lower than a frequency reduction point; wherein the control circuit further adaptively adjusts the operation signal according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin; the control circuit comprising: a frequency control circuit, which is coupled to the opto-coupler circuit, for generating a clock signal according to the feedback signal; an attenuator circuit, which is coupled to the tertiary winding and the opto-coupler circuit, for generating the feedback attenuation signal according to the voltage sense signal and the feedback signal; a comparison circuit, which is coupled to the attenuator circuit and the current sense circuit, for generating a comparison signal according to the feedback attenuation signal and the current sense signal; and a flip-flop circuit, which is coupled to the frequency control circuit and the comparison circuit, for generating the operation signal according to the clock signal and the comparison signal; wherein the attenuator circuit adaptively adjusts the feedback attenuation according to the voltage sense signal, and attenuating the feedback signal with the feedback attenuation to generate the feedback attenuation signal, such that the feedback attenuation signal when the output voltage is switched to the second voltage, is lower than the feedback attenuation signal when the output voltage is switched to the first voltage.

From another perspective, the present invention provides a control circuit of a flyback power converter for supplying a programmable output voltage which is switchable between at least a first voltage and a second voltage according to a setting signal, wherein the first voltage is higher than the second voltage; wherein the flyback power converter includes: a transformer circuit, which includes: a primary winding, for receiving an input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a current sense circuit, which is coupled to the power switch circuit, for generating a current sense signal according to a switch current flowing through the power switch; an opto-coupler circuit, which is coupled to the secondary winding, for generating a feedback signal according to an output power and the setting signal; and the control circuit; wherein the control circuit reduces an operation frequency of the operation signal when the feedback signal is lower than a frequency reduction point; wherein the control circuit further adaptively adjusts the operation signal according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin; the control circuit comprising: a frequency control circuit, which is coupled to the opto-coupler circuit, for generating a clock signal according to the feedback signal; a slope compensation control circuit, which is coupled to the tertiary winding, for generating the slope compensation signal according to the voltage sense signal; an adder circuit, which is coupled to the slope compensation control circuit and the current sense circuit, for compensating the slope of the current sense signal with the slope compensation signal to generate a current sense compensation signal; a comparison circuit, which is coupled to the opto-coupler circuit and the adder circuit, for generating a comparison signal according to the feedback signal and the current sense compensation signal; and a flip-flop circuit, which is coupled to the frequency control circuit and the comparison circuit, for generating the operation signal according to the clock signal and the comparison signal; wherein the slope compensation control circuit adaptively adjusts the slope compensation signal according to the voltage sense signal, such that the current sense compensation signal when the output voltage is switched to the second voltage, is higher than the current sense compensation signal when the output voltage is switched to the first voltage.

The objectives, technical details, features, and effects of the present invention will be better understood with regard to the detailed description of the embodiments below.

DESCRIPTION OF THE PREFERRED EMBODIMENTS

Figure 1A:
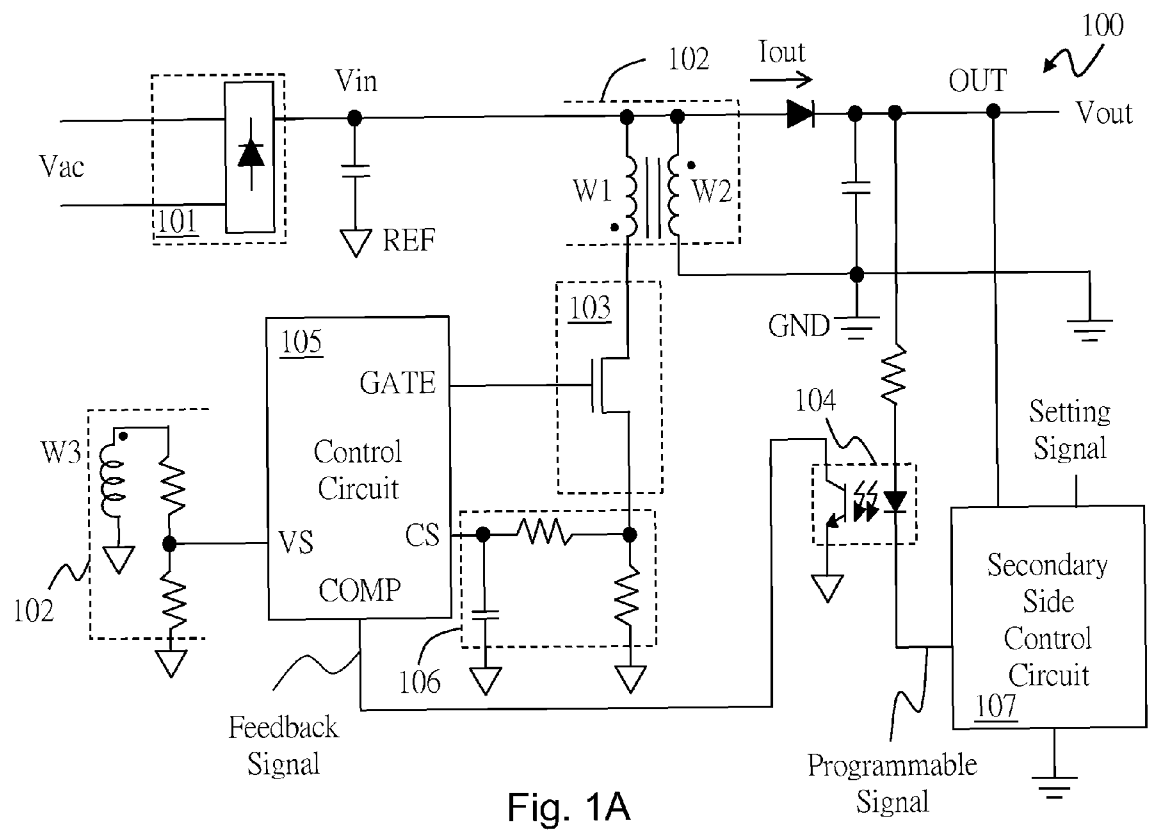
FIGS. 1A and 1B show a first embodiment of the present invention.
Figure 1B:
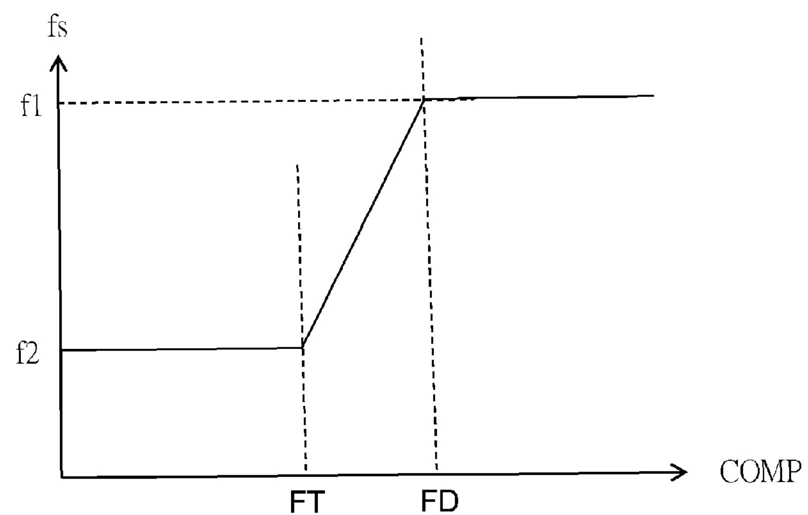

Please refer to FIGS. 1A and 1B for a first embodiment according to the present invention. As shown in FIG. 1A, a rectifier circuit 101 rectifies an alternating current (AC) voltage Vac to generate an input voltage Vin. The rectifier circuit 101 is for example but not limited to a bridge rectifier circuit. A transformer circuit 102 of the flyback power converter 100 receives the input voltage Vin, and converts it to the output voltage Vout. The flyback power converter 100 switches the output voltage Vout between different voltages according to a setting signal; in this embodiment, the different voltages include at least a first voltage and a second voltage, wherein the first voltage is higher than the second voltage. The flyback power converter 100 includes the aforementioned transformer circuit 102, a power switch circuit 103, an opto-coupler circuit 104, a control circuit 105, a current sense circuit 106, and a secondary side control circuit 107.

The transformer circuit 102 includes a primary winding W1, a secondary winding W2, and a tertiary winding W3. The secondary winding W2 is electrically connected to a ground level GND. The tertiary winding W3 and the current sense circuit 106 are coupled to a reference level REF. The primary winding W1 is used for receiving the input voltage V1. The secondary winding W2 is used for generating the output voltage Vout at the output node OUT. The tertiary winding W3 is used for generating a voltage sense signal VS according to the output voltage Vout. The power switch circuit 103 is coupled to the primary winding W1, for operating at least one power switch therein according to an operation signal GATE, so as to convert the input voltage Vin to the output voltage Vout. The current sense circuit 106 is coupled to the power switch circuit 103, for generating a current sense signal CS according to a switch current flowing through the power switch.

The opto-coupler circuit 104 is coupled to the secondary winding W2, for generating a feedback signal COMP according to the output voltage Vout and a setting signal. In this embodiment, the secondary side control circuit 107 is coupled to the opto-coupler circuit 104 and the secondary winding W2, for generating a programmable signal according to the output voltage Vout and the setting signal. The control circuit 105 is coupled to the tertiary winding W3, the current sense circuit 106, the opto-coupler circuit 104, and the power switch circuit 103, for generating the operation signal GATE according to the voltage sense signal VS, the current sense signal CS, and the feedback signal COMP. The control circuit 105 reduces an operation frequency fs of the operation signal GATE when the feedback signal COMP is lower than a frequency reduction point FD. Referring to FIG. 1B, the frequency reduction point FD is a predetermined reference level of the feedback signal COMP. The control circuit 105 starts to reduce the operation frequency fs of the operation signal GATE when the feedback signal COMP drops to the predetermined reference level, i.e., the frequency reduction point FD. When the feedback signal COMP exceeds the frequency reduction point FD, the operation frequency fs of the operation signal GATE for example is a constant frequency f1, and when the feedback signal COMP is higher than a threshold point FT and lower than the frequency reduction point FD, the operation frequency fs for example is decreasing with a constant slope rate, and when the feedback signal COMP does not exceed the threshold point FT, the operation frequency fs of the operation signal GATE for example is a constant frequency f2; the constant frequency f2 is preferably set higher than an audio frequency so that the operation of the flyback power converter 100 does not generate an audible noise. The purpose of reducing the operation frequency fs of the operation signal GATE according to the feedback signal COMP is to increase the power conversion efficiency in a light load condition. The feedback signal COMP is related to the output power.

According to the present invention, the control circuit 105 further adaptively adjusts the operation signal GATE according to the voltage sense signal VS, such that the flyback power converter 100 maintains a same or relatively higher operation frequency fs of the operation signal GATE and provides a same output current Iout when the output voltage Vout is switched to the second voltage as compared with when the output voltage Vout is switched to the first voltage, to maintain a phase margin. "Phase margin" is well known by those skilled in the art, so detailed explanations thereof are omitted here. The control circuit 105 adaptively adjusts the operation signal GATE by at least one of the following methods according to the voltage sense signal VS:

(1) adaptively adjusting the frequency reduction point FD of the feedback signal COMP according to the voltage sense signal VS;

(2) adaptively adjusting a current gain according to the voltage sense signal VS, and amplifying the current sense signal with the current gain to generate a current sense gain signal, such that the current sense gain signal when the output voltage Vout is switched to the second voltage, is higher than the current sense gain signal when the output voltage Vout is switched to the first voltage;

(3) adaptively adjusting a feedback attenuation according to the voltage sense signal VS, and attenuating the feedback signal with the feedback attenuation to generate a feedback attenuation signal, such that the feedback attenuation signal when the output voltage Vout is switched to the second voltage, is lower than the feedback attenuation signal when the output voltage Vout is switched to the first voltage; and (4) adaptively adjusting a slope compensation signal according to the voltage sense signal VS, and compensating a slope of the current sense signal CS with the slope compensation signal to generate a current sense compensation signal, such that the current sense compensation signal when the output voltage Vout is switched to the second voltage, is higher than the current sense compensation signal when the output voltage Vout is switched to the first voltage.

Figure 2A:
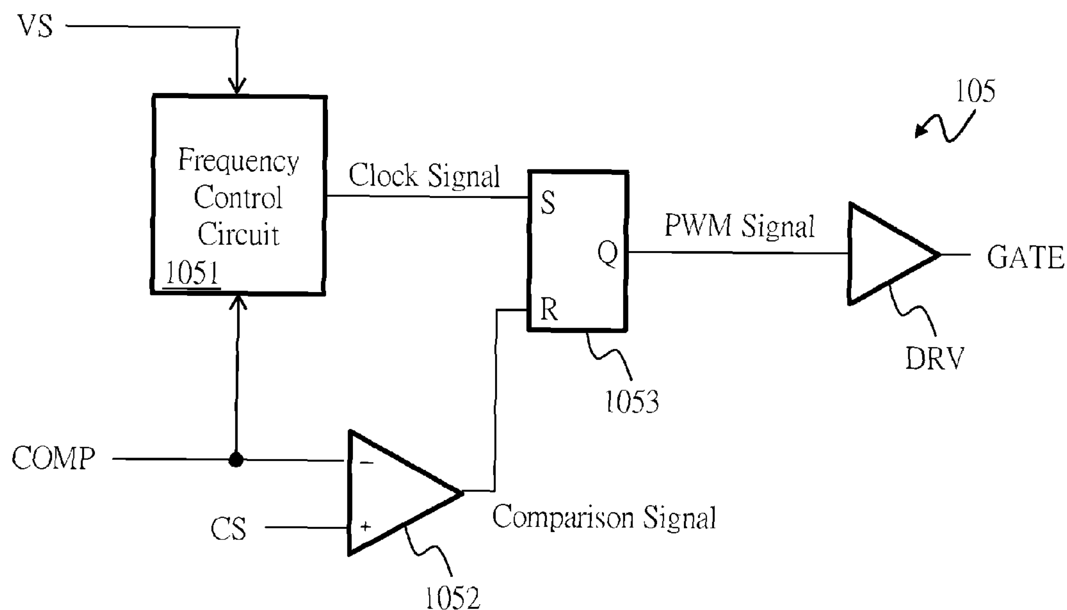
FIGS. 2A and 2B show a second embodiment of the present invention.
Figure 2B:
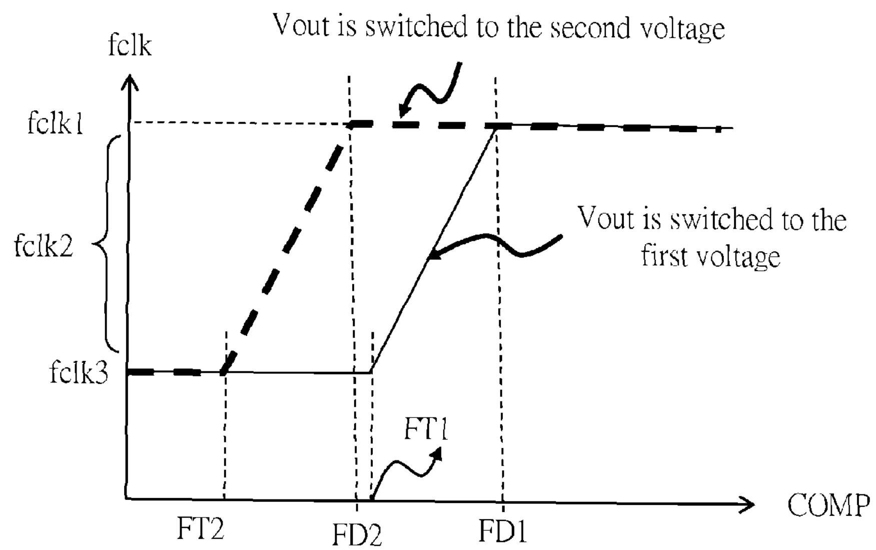

FIGS. 2A and 2B show a second embodiment of the present invention. This embodiment shows a more specific embodiment of the control circuit 105. As shown in FIG. 2A, in this embodiment, the control circuit 105 includes for example but not limited to a frequency control circuit 1051, a comparison circuit 1052, a flip-flop circuit 1053, and a driver circuit DRV. The frequency control circuit 1051 is coupled to the tertiary winding W3 and the opto-coupler circuit 104, for generating a clock signal according to the voltage sense signal VS and the feedback signal COMP, wherein the clock signal is inputted to a set terminal S of the flip-flop circuit 1053. The comparison circuit 1052 is coupled to the opto-coupler circuit 104 and the current sense circuit 102, for generating a comparison signal according to the feedback signal COMP and the current sense signal CS, wherein the comparison signal is inputted to a reset terminal R of the flip-flop circuit 1053. The flip-flop circuit 1053 is coupled to the frequency control circuit 1051 and the comparison circuit 1052, for generating a PWM signal according to the clock signal and the comparison signal, wherein the PWM signal is inputted to the driver circuit DRV. The driver circuit DRV receives the PWM signal and generate the operation signal GATE. The driver circuit DRV can be viewed as a part of or an output stage of the flip-flop circuit 1053, so it can be equivalently viewed as that the flip-flop circuit 1053 generates the operation signal GATE.

In this embodiment, the frequency control circuit 1051 adaptively adjusts the frequency reduction point FD of the feedback signal COMP by adjusting the clock signal according to the voltage sense signal VS. The clock signal A has a clock frequency fclk which is related to the operation frequency fs. Therefore, to adjust the clock frequency fclk of the clock signal is to adjust the operation frequency fs. For example, as shown in FIG. 2B, the frequency control circuit 1051 adjusts the clock signal when the voltage sense signal VS indicates that the output voltage Vout is switched to the relatively higher voltage, i.e., the first voltage, and accordingly, the frequency reduction point FD of the feedback signal COMP is determined to be the frequency reduction point FD1. On the other hand, the frequency control circuit 1051 adjusts the clock signal when the voltage sense signal VS indicates that the output voltage Vout is switched to the relatively lower voltage, i.e., the second voltage, and accordingly, the frequency reduction point FD of the feedback signal COMP is determined to be the frequency reduction point FD2.

Still referring to FIG. 2B, when the feedback signal COMP exceeds the frequency reduction point FD1 or FD2 (corresponding to whether the output voltage Vout is switched to the first voltage or the second voltage), the clock signal has a constant first frequency fclk1. When the feedback signal COMP is between a threshold point FT1 and the frequency reduction point FD1 or between a threshold point FT2 and the frequency reduction point FD2, the clock signal has a second frequency fclk2 which is adaptively adjusted according to the feedback signal COMP as shown in FIG. 2B. When the feedback signal COMP does not exceed the threshold point FT1 or FT2, the clock signal fclk has a constant third frequency fclk3. The frequency control circuit 1051 reduces the frequency reduction point FD2 when the output voltage is switched to the second voltage, to a level lower than the frequency reduction point FD1 when the output voltage Vout is switched to the first voltage. By adjusting the frequency reduction point FD, the flyback power converter 100 maintains a same or relatively higher operation frequency fs of the operation signal GATE and provides a same output current when the output voltage Vout is switched to the second voltage as compared with when the output voltage Vout is switched to the first voltage, to maintain a phase margin.

Figure 3:
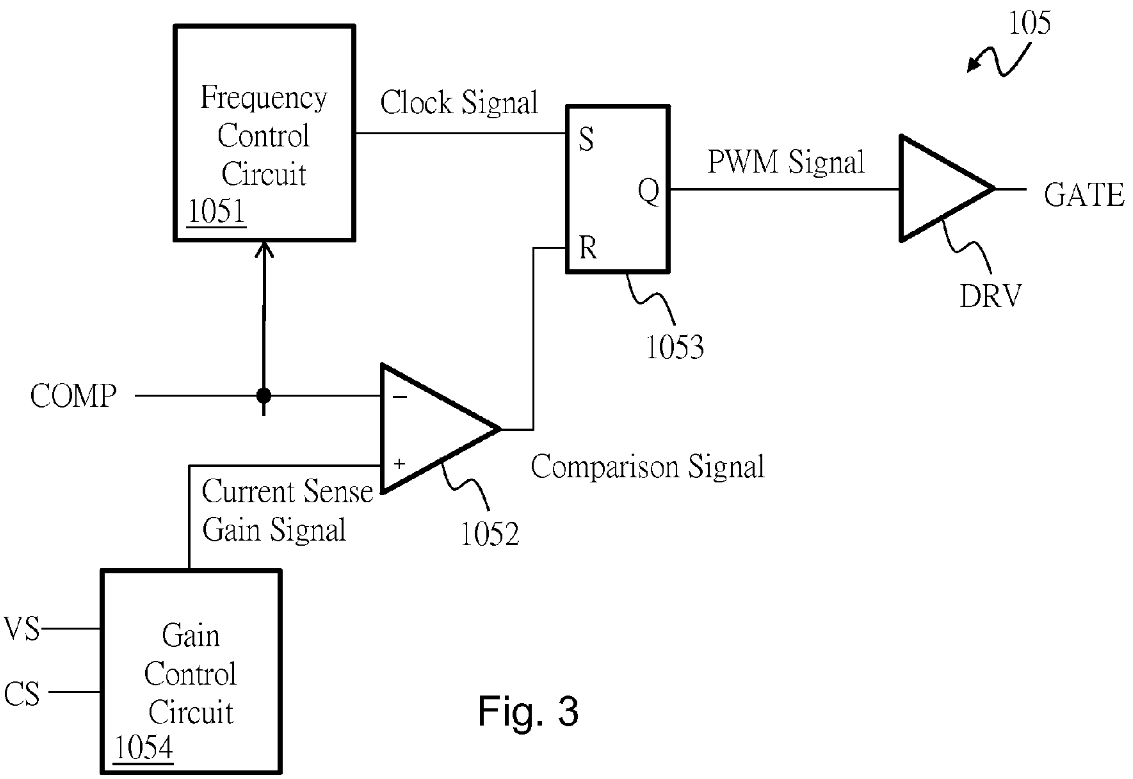
FIG. 3 shows a third embodiment of the present invention.

FIG. 3 shows a third embodiment of the present invention. This embodiment shows another more specific embodiment of the control circuit 105. As shown in FIG. 3, in this embodiment, the control circuit 105 includes for example but not limited to a frequency control circuit 1051, a comparison circuit 1052, a flip-flop circuit 1053, a gain control circuit 1054, and a driver circuit DRV. The frequency control circuit 1051 is coupled to the opto-coupler circuit 104, for generating a clock signal according to the feedback signal COMP, wherein the clock signal is inputted to the set terminal S of the flip-flop circuit 1053. The gain control circuit 1054 is coupled to the tertiary winding W3 and the current sense circuit 106, for generating a current sense gain signal according to the voltage sense signal VS and the current sense signal CS. The comparison circuit 1052 is coupled to the opto-coupler circuit 104 and the gain control circuit 1054, for generating a comparison signal according to the feedback signal COMP and the current sense gain signal, wherein the comparison signal is inputted to a reset terminal R of the flip-flop circuit 1053. The flip-flop circuit 1053 is coupled to the frequency control circuit 1051 and the comparison circuit 1052, for generating a PWM signal according to the clock signal and the comparison signal, wherein the PWM signal is inputted to the driver circuit DRV. The driver circuit DRV receives the PWM signal and generates the operation signal GATE. The driver circuit DRV can be viewed as a part of or an output stage of the flip-flop circuit 1053, so it can be equivalently viewed as that the flip-flop circuit 1053 generates the operation signal GATE.

The gain control circuit 1054 adaptively adjusts the current gain according to the voltage sense signal VS, and amplifying the current sense signal with the current gain to generate the current sense gain signal, such that the current sense gain signal when the output voltage Vout is switched to the second voltage, is higher than the current sense gain signal when the output voltage Vout is switched to the first voltage.

Figure 4:
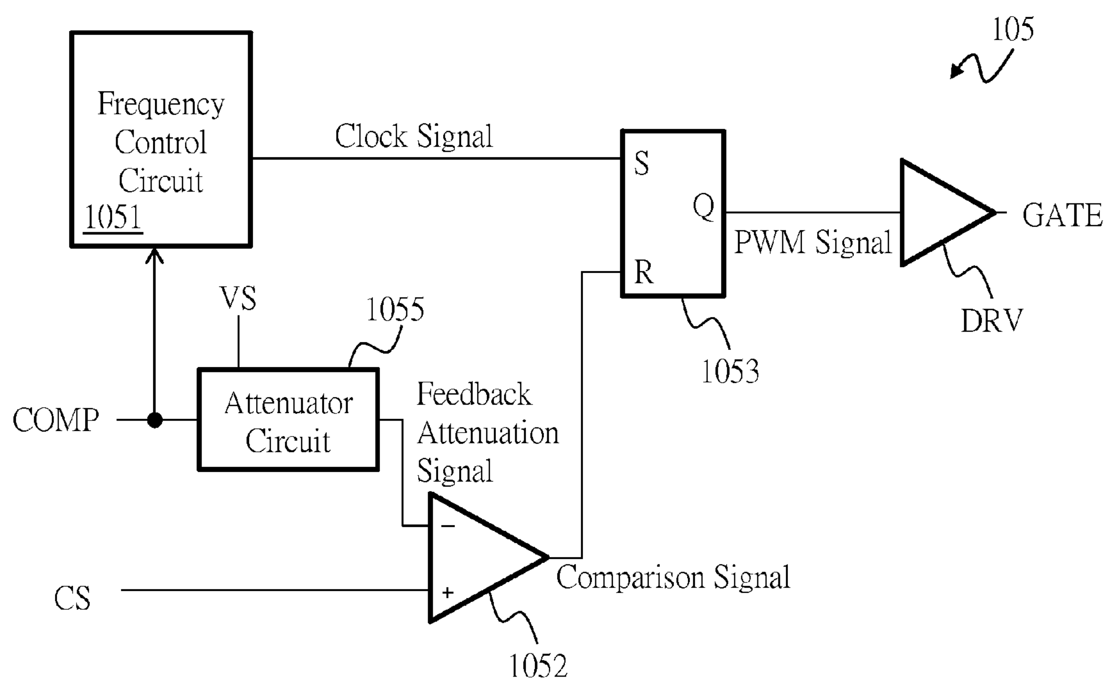
FIG. 4 shows a fourth embodiment of the present invention.

FIG. 4 shows a fourth embodiment of the present invention. This embodiment shows another more specific embodiment of the control circuit 105. As shown in FIG. 4, in this embodiment, the control circuit 105 includes for example but not limited to a frequency control circuit 1051, a comparison circuit 1052, a flip-flop circuit 1053, an attenuator circuit 1055, and a driver circuit DRV. The frequency control circuit 1051 is coupled to the opto-coupler circuit 104, for generating a clock signal according to the feedback signal COMP, wherein the clock signal is inputted to the set terminal S of the flip-flop circuit 1053. The attenuator circuit 1055 is coupled to the tertiary winding W3 and the opto-coupler circuit 104, for generating the feedback attenuation signal according to the voltage sense signal VS and the feedback signal COMP. The comparison circuit 1052 is coupled to the attenuator circuit 1055 and t the current sense circuit 106, for generating a comparison signal according to the feedback attenuation signal and the current sense signal, wherein the comparison signal is inputted to a reset terminal R of the flip-flop circuit 1053. The flip-flop circuit 1053 is coupled to the frequency control circuit 1051 and the comparison circuit 1052, for generating a PWM signal according to the clock signal and the comparison signal, wherein the PWM signal is inputted to the driver circuit DRV. The driver circuit DRV receives the PWM signal and generate the operation signal GATE. The driver circuit DRV can be viewed as a part of or an output stage of the flip-flop circuit 1053, so it can be equivalently viewed as that the flip-flop circuit 1053 generates the operation signal GATE.

The attenuator circuit 1055 adaptively adjusts the feedback attenuation according to the voltage sense signal VS, and attenuating the feedback signal COMP with the feedback attenuation to generate the feedback attenuation signal, such that the feedback attenuation signal when the output voltage is switched to the second voltage, is lower than the feedback attenuation signal when the output voltage is switched to the first voltage.

Figure 5:
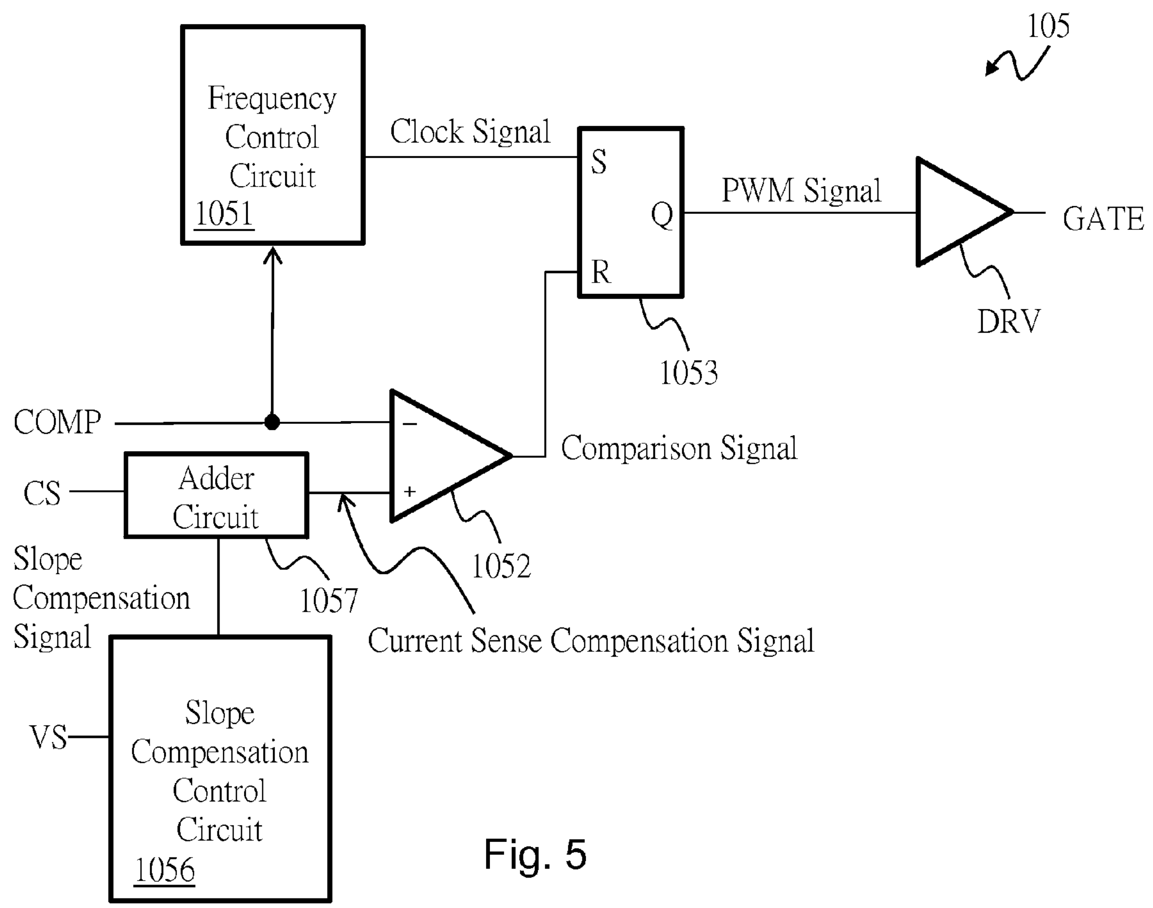
FIG. 5 shows a fifth embodiment of the present invention.

FIG. 5 shows a fifth embodiment of the present invention. This embodiment shows another more specific embodiment of the control circuit 105. As shown in FIG. 5, in this embodiment, the control circuit 105 includes for example but not limited to a frequency control circuit 1051, a comparison circuit 1052, a flip-flop circuit 1053, a slope compensation control circuit 1056, an adder circuit 1057, and a driver circuit DRV. The frequency control circuit 1051 is coupled to the opto-coupler circuit 104, for generating a clock signal according to the feedback signal COMP, wherein the clock signal is inputted to the set terminal S of the flip-flop circuit 1053. The slope compensation control circuit 1056 is coupled to the tertiary winding W3, for generating the slope compensation signal according to the voltage sense signal VS. The adder circuit 1057 is coupled to the slope compensation control circuit 1056 and the current sense circuit 106, for compensating the slope of the current sense signal CS with the slope compensation signal to generate a current sense compensation signal. The comparison circuit 1052 is coupled to the opto-coupler circuit 104 and the adder circuit 1057, for generating a comparison signal according to the feedback signal COMP and the current sense compensation signal, wherein the comparison signal is inputted to a reset terminal R of the flip-flop circuit 1053. The flip-flop circuit 1053 is coupled to the frequency control circuit 1051 and the comparison circuit 1052, for generating a PWM signal according to the clock signal and the comparison signal, wherein the PWM signal is inputted to the driver circuit DRV. The driver circuit DRV receives the PWM signal and generate the operation signal GATE. Note that, the driver circuit DRV can be considered as apart of the flip-flop circuit 1053, such that the flip-flop circuit 1053 generates the operation signal GATE.

The slope compensation control circuit 1056 adaptively adjusts the slope compensation signal according to the voltage sense signal VS, such that the current sense compensation signal when the output voltage Vout is switched to the second voltage, is higher than the current sense compensation signal when the output voltage Vout is switched to the first voltage.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the programmable output voltage Vout is not limited to having only two different predetermined levels Vout1 and Vout2, but may have three or more different predetermined levels. For another example, the flip-flop circuit is not limited to the SR flip-flop circuit as shown in the embodiments, but may be another type of flip-flop circuit. In view of the foregoing, the spirit of the present invention should cover all such and other modifications and variations, which should be interpreted to fall within the scope of the following claims and their equivalents.

What is claimed is:

1. A flyback power converter for supplying a programmable output voltage, wherein the flyback power converter switches the output voltage between at least a first voltage and a second voltage according to a setting signal, the first voltage being higher than the second voltage, the flyback power converter comprising:

a transformer circuit, which includes:

a primary winding, for receiving an input voltage;

a secondary winding, for generating the output voltage at an output node; and a tertiary winding, for generating a voltage sense signal according to the output voltage;

a power switch circuit, which is coupled to the primary winding, for operating a power switch therein according to an operation signal, so as to convert the input voltage to the output voltage;

a current sense circuit, which is coupled to the power switch circuit, for generating a current sense signal according to a switch current flowing through the power switch;

an opto-coupler circuit, which is coupled to the secondary winding, for generating a feedback signal according to an output power and the setting signal; and a control circuit, which is coupled to the tertiary winding, the current sense circuit, the opto-coupler circuit, and the power switch circuit, for generating the operation signal according to the voltage sense signal, the current sense signal, and the feedback signal;

wherein the control circuit reduces an operation frequency of the operation signal when the feedback signal is lower than a frequency reduction point;

wherein the control circuit further adaptively adjusts the operation signal by at least one of the following methods according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin:

(1) adaptively adjusting the frequency reduction point of the feedback signal according to the voltage sense signal;

(2) adaptively adjusting a current gain according to the voltage sense signal, and amplifying the current sense signal with the current gain to generate a current sense gain signal, such that the current sense gain signal when the output voltage is switched to the second voltage, is higher than the current sense gain signal when the output voltage is switched to the first voltage;

(3) adaptively adjusting a feedback attenuation according to the voltage sense signal, and attenuating the feedback signal with the feedback attenuation to generate a feedback attenuation signal, such that the feedback attenuation signal when the output voltage is switched to the second voltage, is lower than the feedback attenuation signal when the output voltage is switched to the first voltage; and (4) adaptively adjusting a slope compensation signal according to the voltage sense signal, and compensating a slope of the current sense signal with the slope compensation signal to generate a current sense compensation signal, such that the current sense compensation signal when the output voltage is switched to the second voltage, is higher than the current sense compensation signal when the output voltage is switched to the first voltage.

2. The flyback power converter of claim 1, wherein the control circuit includes:

a frequency control circuit, which is coupled to the tertiary winding and the opto-coupler circuit, for generating a clock signal according to the voltage sense signal and the feedback signal;

a comparison circuit, which is coupled to the opto-coupler circuit and the current sense circuit, for generating a comparison signal according to the feedback signal and the current sense signal; and a flip-flop circuit, which is coupled to the frequency control circuit and the comparison circuit, for generating the operation signal according to the clock signal and the comparison signal;

wherein the frequency control circuit adaptively adjusts the frequency reduction point of the feedback signal by adjusting the clock signal according to the voltage sense signal.

3. The flyback power converter of claim 2, wherein when the feedback signal exceeds the frequency reduction point, the clock signal has a constant first frequency, and when the feedback signal is between a threshold point and the frequency reduction point, the clock signal has a second frequency which is adaptively adjusted according to the feedback signal, and when the feedback signal does not exceed the threshold point, the clock signal has a constant third frequency;

wherein the frequency control circuit reduces the frequency reduction point when the output voltage is switched to the second voltage, to a level lower than the frequency reduction point when the output voltage is switched to the first voltage.

4. The flyback power converter of claim 1, wherein the control circuit includes:

a frequency control circuit, which is coupled to the opto-coupler circuit, for generating a clock signal according to the feedback signal;

a gain control circuit, which is coupled to the tertiary winding and the current sense circuit, for generating the current sense gain signal according to the voltage sense signal and the current sense signal;

a comparison circuit, which is coupled to the opto-coupler circuit and the gain control circuit, for generating a comparison signal according to the feedback signal and the current sense gain signal; and a flip-flop circuit, which is coupled to the frequency control circuit and the comparison circuit, for generating the operation signal according to the clock signal and the comparison signal;

wherein the gain control circuit adaptively adjusts the current gain according to the voltage sense signal, and amplifying the current sense signal with the current gain to generate the current sense gain signal, such that the current sense gain signal when the output voltage is switched to the second voltage, is higher than the current sense gain signal when the output voltage is switched to the first voltage.

5. The flyback power converter of claim 1, wherein the control circuit includes:

a frequency control circuit, which is coupled to the opto-coupler circuit, for generating a clock signal according to the feedback signal;

an attenuator circuit, which is coupled to the tertiary winding and the opto-coupler circuit, for generating the feedback attenuation signal according to the voltage sense signal and the feedback signal;

a comparison circuit, which is coupled to the attenuator circuit and the current sense circuit, for generating a comparison signal according to the feedback attenuation signal and the current sense signal; and a flip-flop circuit, which is coupled to the frequency control circuit and the comparison circuit, for generating the operation signal according to the clock signal and the comparison signal;

wherein the attenuator circuit adaptively adjusts the feedback attenuation according to the voltage sense signal, and attenuating the feedback signal with the feedback attenuation to generate the feedback attenuation signal, such that the feedback attenuation signal when the output voltage is switched to the second voltage, is lower than the feedback attenuation signal when the output voltage is switched to the first voltage.

6. The flyback power converter of claim 1, wherein the control circuit includes:

a frequency control circuit, which is coupled to the opto-coupler circuit, for generating a clock signal according to the feedback signal;

a slope compensation control circuit, which is coupled to the tertiary winding, for generating the slope compensation signal according to the voltage sense signal;

an adder circuit, which is coupled to the slope compensation control circuit and the current sense circuit, for compensating the slope of the current sense signal with the slope compensation signal to generate a current sense compensation signal;

a comparison circuit, which is coupled to the opto-coupler circuit and the adder circuit, for generating a comparison signal according to the feedback signal and the current sense compensation signal; and a flip-flop circuit, which is coupled to the frequency control circuit and the comparison circuit, for generating the operation signal according to the clock signal and the comparison signal;

wherein the slope compensation control circuit adaptively adjusts the slope compensation signal according to the voltage sense signal, such that the current sense compensation signal when the output voltage is switched to the second voltage, is higher than the current sense compensation signal when the output voltage is switched to the first voltage.

7. A control method of a flyback power converter for supplying a programmable output voltage which is switchable between at least a first voltage and a second voltage according to a setting signal, wherein the first voltage is higher than the second voltage, the control method comprising:

operating a power switch according to an operation signal, so as to convert the input voltage to the output voltage;

generating a voltage sense signal according to the output voltage;

generating a current sense signal according to a switch current flowing through the power switch;

generating a feedback signal according to an output power and the setting signal;

generating the operation signal according to the voltage sense signal, the current sense signal, and the feedback signal;

reducing an operation frequency of the operation signal when the feedback signal is lower than a frequency reduction point; and adaptively adjusting the operation signal by at least one of the following methods according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin:

(1) adaptively adjusting the frequency reduction point of the feedback signal according to the voltage sense signal;

(2) adaptively adjusting a current gain according to the voltage sense signal, and amplifying the current sense signal with the current gain to generate a current sense gain signal, such that the current sense gain signal when the output voltage is switched to the second voltage, is higher than the current sense gain signal when the output voltage is switched to the first voltage;

(3) adaptively adjusting a feedback attenuation according to the voltage sense signal, and attenuating the feedback signal with the feedback attenuation to generate a feedback attenuation signal, such that the feedback attenuation signal when the output voltage is switched to the second voltage, is lower than the feedback attenuation signal when the output voltage is switched to the first voltage; and (4) adaptively adjusting a slope compensation signal according to the voltage sense signal, and compensating a slope of the current sense signal with the slope compensation signal to generate a current sense compensation signal, such that the current sense compensation signal when the output voltage is switched to the second voltage, is higher than the current sense compensation signal when the output voltage is switched to the first voltage.

8. The control method of claim 7, wherein the step of generating the operation signal includes:

generating a clock signal according to the voltage sense signal and the feedback signal;

generating a comparison signal according to the feedback signal and the current sense signal;

generating the operation signal according to the clock signal and the comparison signal; and adaptively adjusting the frequency reduction point of the feedback signal by adjusting the clock signal according to the voltage sense signal.

9. The control method of claim 8, wherein when the feedback signal exceeds the frequency reduction point, the clock signal has a constant first frequency, and when the feedback signal is between a threshold point and the frequency reduction point, the clock signal has a second frequency which is adaptively adjusted according to the feedback signal, and when the feedback signal does not exceed the threshold point, the clock signal has a constant third frequency;

wherein the step of adaptively adjusting the frequency reduction point of the feedback signal by adjusting the clock signal according to the voltage sense signal, includes: reducing the frequency reduction point when the output voltage is switched to the second voltage, to a level lower than the frequency reduction point when the output voltage is switched to the first voltage.

10. The control method of claim 7, wherein the step of generating the operation signal includes:

generating a clock signal according to the feedback signal;

adaptively adjusting the current gain according to the voltage sense signal and the current sense signal;

amplifying the current sense signal with the current gain to generate a current sense gain signal;

generating a comparison signal according to the feedback signal and the current sense gain signal; and generating the operation signal according to the clock signal and the comparison signal;

wherein the current sense gain signal when the output voltage is switched to the second voltage, is higher than the current sense gain signal when the output voltage is switched to the first voltage.

11. The control method of claim 7, wherein the step of generating the operation signal includes:

generating a clock signal according to the feedback signal;

adaptively adjusting the feedback attenuation according to the voltage sense signal;

attenuating the feedback signal with the feedback attenuation to generate the feedback attenuation signal;

generating a comparison signal according to the feedback attenuation signal and the current sense signal; and generating the operation signal according to the clock signal and the comparison signal;

wherein the feedback attenuation signal when the output voltage is switched to the second voltage, is lower than the feedback attenuation signal when the output voltage is switched to the first voltage.

12. The control method of claim 7, wherein the step of generating the operation signal includes:

generating a clock signal according to the feedback signal;

generating the slope compensation signal according to the voltage sense signal;

compensating the slope of the current sense signal with the slope compensation signal to generate a current sense compensation signal;

generating a comparison signal according to the feedback signal and the current sense compensation signal; and generating the operation signal according to the clock signal and the comparison signal;

wherein the current sense compensation signal when the output voltage is switched to the second voltage, is higher than the current sense compensation signal when the output voltage is switched to the first voltage.

13. A control circuit of a flyback power converter for supplying a programmable output voltage which is switchable between at least a first voltage and a second voltage according to a setting signal, wherein the first voltage is higher than the second voltage; wherein the flyback power converter includes: a transformer circuit, which includes: a primary winding, for receiving an input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a current sense circuit, which is coupled to the power switch circuit, for generating a current sense signal according to a switch current flowing through the power switch; an opto-coupler circuit, which is coupled to the secondary winding, for generating a feedback signal according to an output power and the setting signal; and the control circuit; wherein the control circuit reduces an operation frequency of the operation signal when the feedback signal is lower than a frequency reduction point; wherein the control circuit further adaptively adjusts the operation signal according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin; the control circuit comprising:

a frequency control circuit, which is coupled to the tertiary winding and the opto-coupler circuit, for generating a clock signal according to the voltage sense signal and the feedback signal;

a comparison circuit, which is coupled to the opto-coupler circuit and the current sense circuit, for generating a comparison signal according to the feedback signal and the current sense signal; and a flip-flop circuit, which is coupled to the frequency control circuit and the comparison circuit, for generating the operation signal according to the clock signal and the comparison signal;

wherein the frequency control circuit adaptively adjusts the frequency reduction point of the feedback signal by adjusting the clock signal according to the voltage sense signal.

14. The control circuit of claim 13, wherein when the feedback signal exceeds the frequency reduction point, the clock signal has a constant first frequency, and when the feedback signal is between a threshold point and the frequency reduction point, the clock signal has a second frequency which is adaptively adjusted according to the feedback signal, and when the feedback signal does not exceed the threshold point, the clock signal has a constant third frequency;

wherein the frequency control circuit reduces the frequency reduction point when the output voltage is switched to the second voltage, to a level lower than the frequency reduction point when the output voltage is switched to the first voltage.

15. A control circuit of a flyback power converter for supplying a programmable output voltage which is switchable between at least a first voltage and a second voltage according to a setting signal, wherein the first voltage is higher than the second voltage; wherein the flyback power converter includes: a transformer circuit, which includes: a primary winding, for receiving an input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a current sense circuit, which is coupled to the power switch circuit, for generating a current sense signal according to a switch current flowing through the power switch; an opto-coupler circuit, which is coupled to the secondary winding, for generating a feedback signal according to an output power and the setting signal; and the control circuit; wherein the control circuit reduces an operation frequency of the operation signal when the feedback signal is lower than a frequency reduction point; wherein the control circuit further adaptively adjusts the operation signal according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin; the control circuit comprising:

a frequency control circuit, which is coupled to the opto-coupler circuit, for generating a clock signal according to the feedback signal;

a gain control circuit, which is coupled to the tertiary winding and the current sense circuit, for generating the current sense gain signal according to the voltage sense signal and the current sense signal;

a comparison circuit, which is coupled to the opto-coupler circuit and the gain control circuit, for generating a comparison signal according to the feedback signal and the current sense gain signal; and a flip-flop circuit, which is coupled to the frequency control circuit and the comparison circuit, for generating the operation signal according to the clock signal and the comparison signal;

wherein the gain control circuit adaptively adjusts the current gain according to the voltage sense signal, and amplifying the current sense signal with the current gain to generate the current sense gain signal, such that the current sense gain signal when the output voltage is switched to the second voltage, is higher than the current sense gain signal when the output voltage is switched to the first voltage.

16. A control circuit of a flyback power converter for supplying a programmable output voltage which is switchable between at least a first voltage and a second voltage according to a setting signal, wherein the first voltage is higher than the second voltage; wherein the flyback power converter includes: a transformer circuit, which includes: a primary winding, for receiving an input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a current sense circuit, which is coupled to the power switch circuit, for generating a current sense signal according to a switch current flowing through the power switch; an opto-coupler circuit, which is coupled to the secondary winding, for generating a feedback signal according to an output power and the setting signal; and the control circuit; wherein the control circuit reduces an operation frequency of the operation signal when the feedback signal is lower than a frequency reduction point; wherein the control circuit further adaptively adjusts the operation signal according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin; the control circuit comprising:

a frequency control circuit, which is coupled to the opto-coupler circuit, for generating a clock signal according to the feedback signal;

an attenuator circuit, which is coupled to the tertiary winding and the opto-coupler circuit, for generating the feedback attenuation signal according to the voltage sense signal and the feedback signal;

a comparison circuit, which is coupled to the attenuator circuit and the current sense circuit, for generating a comparison signal according to the feedback attenuation signal and the current sense signal; and a flip-flop circuit, which is coupled to the frequency control circuit and the comparison circuit, for generating the operation signal according to the clock signal and the comparison signal;

wherein the attenuator circuit adaptively adjusts the feedback attenuation according to the voltage sense signal, and attenuating the feedback signal with the feedback attenuation to generate the feedback attenuation signal, such that the feedback attenuation signal when the output voltage is switched to the second voltage, is lower than the feedback attenuation signal when the output voltage is switched to the first voltage.

17. A control circuit of a flyback power converter for supplying a programmable output voltage which is switchable between at least a first voltage and a second voltage according to a setting signal, wherein the first voltage is higher than the second voltage; wherein the flyback power converter includes: a transformer circuit, which includes: a primary winding, for receiving an input voltage; a secondary winding, for generating the output voltage at an output node; and a tertiary winding, for generating a voltage sense signal according to the output voltage; a power switch circuit, which is coupled to the primary winding, for operating a power switch therein according to an operation signal, so as to convert the input voltage to the output voltage; a current sense circuit, which is coupled to the power switch circuit, for generating a current sense signal according to a switch current flowing through the power switch; an opto-coupler circuit, which is coupled to the secondary winding, for generating a feedback signal according to an output power and the setting signal; and the control circuit; wherein the control circuit reduces an operation frequency of the operation signal when the feedback signal is lower than a frequency reduction point; wherein the control circuit further adaptively adjusts the operation signal according to the voltage sense signal, such that the flyback power converter maintains a same or relatively higher operation frequency of the operation signal and provides a same output current when the output voltage is switched to the second voltage as compared with when the output voltage is switched to the first voltage, to maintain a phase margin; the control circuit comprising:

a frequency control circuit, which is coupled to the opto-coupler circuit, for generating a clock signal according to the feedback signal;

a slope compensation control circuit, which is coupled to the tertiary winding, for generating the slope compensation signal according to the voltage sense signal;

an adder circuit, which is coupled to the slope compensation control circuit and the current sense circuit, for compensating the slope of the current sense signal with the slope compensation signal to generate a current sense compensation signal;

a comparison circuit, which is coupled to the opto-coupler circuit and the adder circuit, for generating a comparison signal according to the feedback signal and the current sense compensation signal; and a flip-flop circuit, which is coupled to the frequency control circuit and the comparison circuit, for generating the operation signal according to the clock signal and the comparison signal;

wherein the slope compensation control circuit adaptively adjusts the slope compensation signal according to the voltage sense signal, such that the current sense compensation signal when the output voltage is switched to the second voltage, is higher than the current sense compensation signal when the output voltage is switched to the first voltage.

* * * * *